United States Patent
Shavell et al.

(10) Patent No.: US 10,097,560 B1
(45) Date of Patent: Oct. 9, 2018

(54) SYSTEMS AND METHODS FOR AUTOMATICALLY ADJUSTING USER ACCESS PERMISSIONS BASED ON BEACON PROXIMITY

(71) Applicant: Symantec Corporation, Mountain View, CA (US)

(72) Inventors: Michael Shavell, Merrimack, NH (US); Kevin Jiang, Lafayette, CA (US); Ilya Sokolov, Boston, MA (US); Lei Gu, Bedford, MA (US)

(73) Assignee: Symantec Corporation, Mountain View, CA (US)

( * ) Notice: Subject to any disclaimer, the term of this patent is extended or adjusted under 35 U.S.C. 154(b) by 164 days.

(21) Appl. No.: 15/063,778

(22) Filed: Mar. 8, 2016

(51) Int. Cl.
| | |
|---|---|
| *G06F 21/62* | (2013.01) |
| *H04L 29/06* | (2006.01) |
| *H04W 12/08* | (2009.01) |
| *H04W 4/00* | (2018.01) |
| *H04W 4/80* | (2018.01) |

(52) U.S. Cl.
CPC ............ *H04L 63/107* (2013.01); *H04L 63/20* (2013.01); *H04W 4/008* (2013.01); *H04W 4/80* (2018.02); *H04W 12/08* (2013.01)

(58) Field of Classification Search
CPC ....... H04L 9/3247; H04L 63/10; H04W 88/00
See application file for complete search history.

(56) References Cited

U.S. PATENT DOCUMENTS

| | | |
|---|---|---|
| 6,745,333 B1 | 6/2004 | Thomsen |
| 7,808,958 B1 | 10/2010 | Hernacki et al. |
| 7,856,209 B1 | 12/2010 | Rawat |
| 8,175,577 B1 | 5/2012 | Harvey et al. |
| 2005/0028012 A1 | 2/2005 | Amamiya et al. |
| 2005/0260973 A1 | 11/2005 | van de Groenendaal |
| 2009/0077620 A1 | 3/2009 | Ravi et al. |
| 2009/0116480 A1 | 5/2009 | Kimura et al. |
| 2012/0026993 A1 | 2/2012 | Radpour |

(Continued)

OTHER PUBLICATIONS

Kevin Jiang, et al; Systems and Methods for Locating Devices on Wireless Networks According to Zones; U.S. Appl. No. 14/958,316, filed Dec. 3, 2015.

(Continued)

*Primary Examiner* — Izunna Okeke
(74) *Attorney, Agent, or Firm* — FisherBroyles, LLP (57) ABSTRACT

The disclosed computer-implemented method for automatically adjusting user access permissions based on beacon proximity may include (1) identifying a network-enabled device that is attempting to access a network resource that is protected by a security policy, where the security policy identifies an access level at which one or more devices may access the network resource when the devices are within range of the short-range wireless signal from the secure beacon, (2) determining that the network-enabled device is within range of the short-range wireless signal from the secure beacon, and (3) establishing, according to the security policy, the access level at which the network-enabled device is allowed to access the network resource based at least in part on the network-enabled device being within range of the short-range wireless signal. Various other methods, systems, and computer-readable media are also disclosed.

18 Claims, 7 Drawing Sheets

(56) References Cited

U.S. PATENT DOCUMENTS

| | | |
|---|---|---|
| 2012/0105202 A1 | 5/2012 | Gits et al. |
| 2012/0124202 A1 | 5/2012 | Cooper et al. |
| 2013/0155933 A1* | 6/2013 | Kneckt ............... H04W 74/002 |
| | | 370/312 |
| 2014/0006785 A1 | 1/2014 | Shaliv et al. |
| 2014/0223553 A1 | 8/2014 | Gupta et al. |
| 2014/0351573 A1 | 11/2014 | Martini |
| 2015/0334511 A1* | 11/2015 | Rivera .................... G06F 21/44 |
| | | 455/41.2 |
| 2015/0346313 A1 | 12/2015 | Smith et al. |
| 2016/0037427 A1 | 2/2016 | Lee |
| 2017/0005886 A1 | 1/2017 | Dade et al. |

OTHER PUBLICATIONS

Qiyan Wang, et al; Systems and Methods for Locating Unrecognized Computing Devices; U.S. Appl. No. 14/475,581, filed Sep. 3, 2014.

What is iBeacon? A Guide to Beacons, http://www.ibeacon.com/what-is-ibeacon-a-guide-to-beacons/, as accessed Jan. 13, 2016, (Apr. 30, 2014).

iBeacon, https://en.wikipedia.org/wiki/IBeacon, as accessed Jan. 13, 2016, Wikipedia, Apr. 30, 2014.

Faraday cage, https://en.wikipedia.org/wiki/Faraday_cage, as accessed Jan. 13, 2016, Wikipedia, (Apr. 5, 2004).

Lei Gu, et al; Systems and Methods for Automatically Adjusting Access-Control Policies; U.S. Appl. No. 15/017,954, filed Feb. 8, 2016.

* cited by examiner

SYSTEMS AND METHODS FOR AUTOMATICALLY ADJUSTING USER ACCESS PERMISSIONS BASED ON BEACON PROXIMITY

BACKGROUND

Individuals and organizations frequently seek to exert control over who can access particular services under their control. For example, organizations may institute data-loss prevention policies to prevent corporate information from being shared without permission. As a specific example, certain users may be restricted from accessing certain files, or users may not be allowed to e-mail particular files under certain conditions. Furthermore, organizations may seek to prevent users with higher levels of access from accessing sensitive files when those files are at risk of being transmitted to unauthorized parties. As a specific example, an enterprise may not want a human resources employee in a perimeter conference room to access sensitive files, as that location presents a greater risk for the sensitive files being viewed by an unauthorized party.

Unfortunately, traditional methods for managing user access permissions generally rely on broad policies such as "this user is or is not allowed to access these files." Such a lack of granularity may slow down internal communications. Furthermore, as illustrated in the human resources employee example, a user who does usually have authorized access to sensitive files may inadvertently allow an unauthorized party to view or otherwise access those files if the employee access them from an insecure location. The instant disclosure, therefore, identifies and addresses a need for improved systems and methods by which to automatically adjust user access permissions based on physical location.

SUMMARY

As will be described in greater detail below, the instant disclosure describes various systems and methods for automatically adjusting user access permissions based on beacon proximity by managing a device's level of access based on the device's proximity to one or more secure beacons. These secure beacons may be used in a variety of ways to protect information.

In one example, a computer-implemented method for automatically adjusting user access permissions based on beacon proximity may include (1) identifying a network-enabled device that is attempting to access a network resource that is protected by a security policy, (2) determining that the network-enabled device is within range of the short-range wireless signal from the secure beacon, and (3) establishing, according to the security policy, the access level at which the network-enabled device is allowed to access the network resource based at least in part on the network-enabled device being within range of the short-range wireless signal from the secure beacon. In some examples, establishing the access level at which the network-enabled device may access the network resource may include preventing the network-enabled device from accessing at least one network resource. Additionally or alternatively, establishing the access level at which the network-enabled device may access the network resource may include granting the network-enabled device access to at least one secure network resource. Moreover, the computer-implemented method may further include determining that the network-enabled device is within range of an additional short-range wireless signal from an additional secure beacon.

In some embodiments, the secure beacon may include at least one mechanism that prevents attackers from spoofing the short-range wireless signal. For example, the secure beacon may periodically rotate the short-range wireless signal by altering information contained within the short-range wireless signal. Furthermore, the secure beacon may report the rotation of the short-range wireless signal to an access-management server that enforces the security policy and establishes the access level at which the network-enabled device is allowed to access the network resource.

Additionally or alternatively, the secure beacon may sign the information contained in the short-range wireless signal with a digital signature. The digital signature may enable the network-enabled device to demonstrate the authenticity and the integrity of the short-range wireless signal to an access-management server that enforces the security policy and establishes the access level at which the network-enabled device is allowed to access the network resource. In these examples, determining that the network-enabled device is within range of the short-range wireless signal from the secure beacon may include receiving, at the access-management server, the signed information contained in the short-range wireless signal from the network-enabled device and verifying the digital signature attached to the signed information.

The short-range wireless signal may contain a variety of information. For example, the short-range wireless signal may contain information describing (1) the time at which the secure beacon transmitted the short-range wireless signal, (2) a unique identifier associated with the secure beacon, (3) a group identifier associated with a collection of beacons that includes the secure beacon, and/or (4) physical location information associated with the secure beacon.

The secure beacon itself may take a variety of forms. In one embodiment, the secure beacon may include an active beacon that periodically transmits the short-range wireless signal. Additionally or alternatively, the secure beacon may include a passive beacon that only transmits the short-range wireless signal in response to a probe signal from the network-enabled device. Furthermore, the secure beacon may be embedded within a physical object that is expected to remain stationary.

In some embodiments, the computer-implemented method may include maintaining a registry of multiple secure beacons in association with a security policy for each secure beacon in the registry. Such a registry may contain an entry for the secure beacon. Additionally, each additional secure beacon in the registry may be located in a different physical location from other secure beacons in the registry. Furthermore, each additional security policy in the registry may establish a policy that is appropriate to the physical location of the additional secure beacon that is associated with the additional security policy.

In one embodiment, a system for implementing the above-described method may include (1) an identification module, stored in memory, that identifies a network-enabled device that is attempting to access a network resource that is protected by a security policy, (2) a determination module, stored in memory, that determines that the network-enabled device is within range of a short-range wireless signal from a secure beacon, (3) an establishing module, stored in memory, that establishes, according to the security policy, the access level at which the network-enabled device is allowed to access the network resource based at least in part on the network-enabled device being within range of the short-range wireless signal from the secure beacon, and (4) at least one physical processor configured to execute the identification module, the determination module, and the establishing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a network-enabled device that is attempting to access a network resource that is protected by a security policy, (2) determine that the network-enabled device is within range of the short-range wireless signal from the secure beacon, and (3) establish, according to the security policy, the access level at which the network-enabled device is allowed to access the network resource based at least in part on the network-enabled device being within range of the short-range wireless signal from the secure beacon.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for automatically adjusting user access permissions based on beacon proximity. As will be explained in greater detail below, systems and methods described herein may determine that a network-enabled device is within range of one or more secure beacons, and in response to making this determination, may establish access levels at which the network-enabled device may interact with various resources connected to the network.

Figure 1:
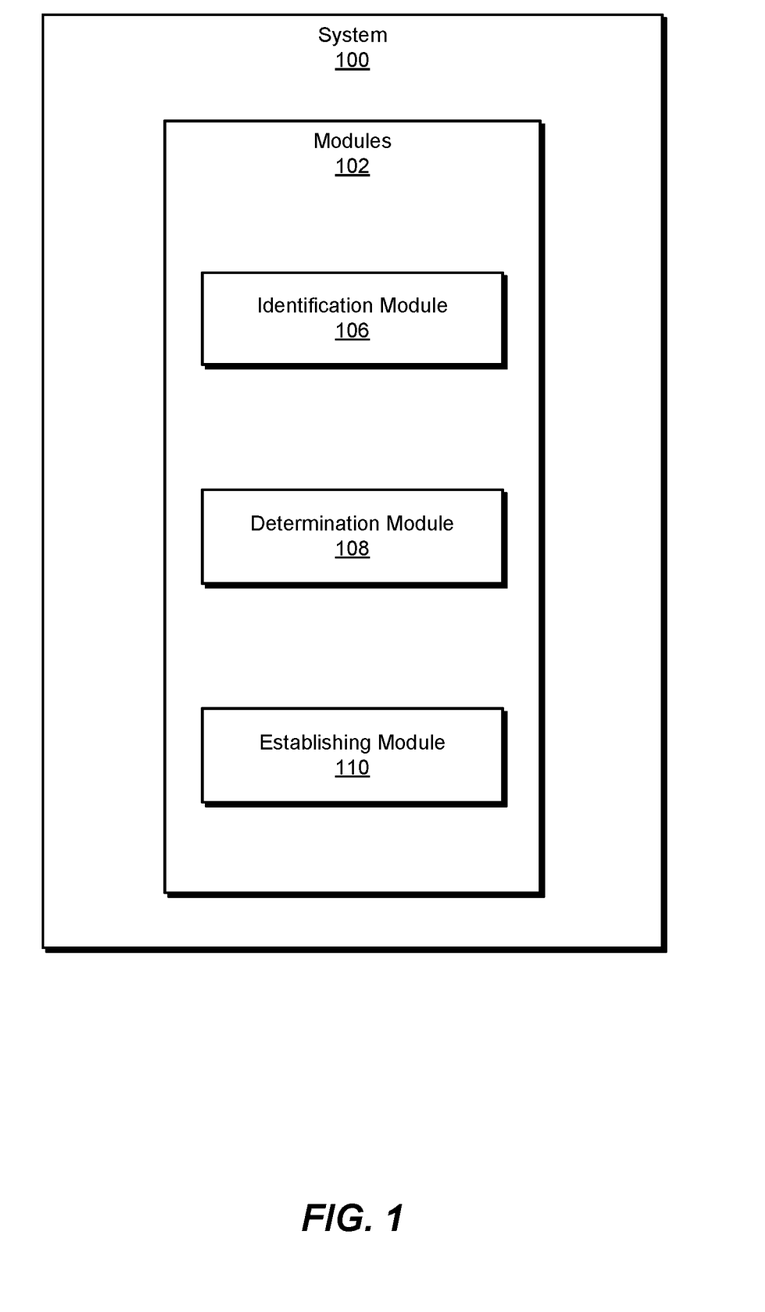
FIG. 1 is a block diagram of an exemplary system for automatically adjusting user access permissions based on beacon proximity.
Figure 2:
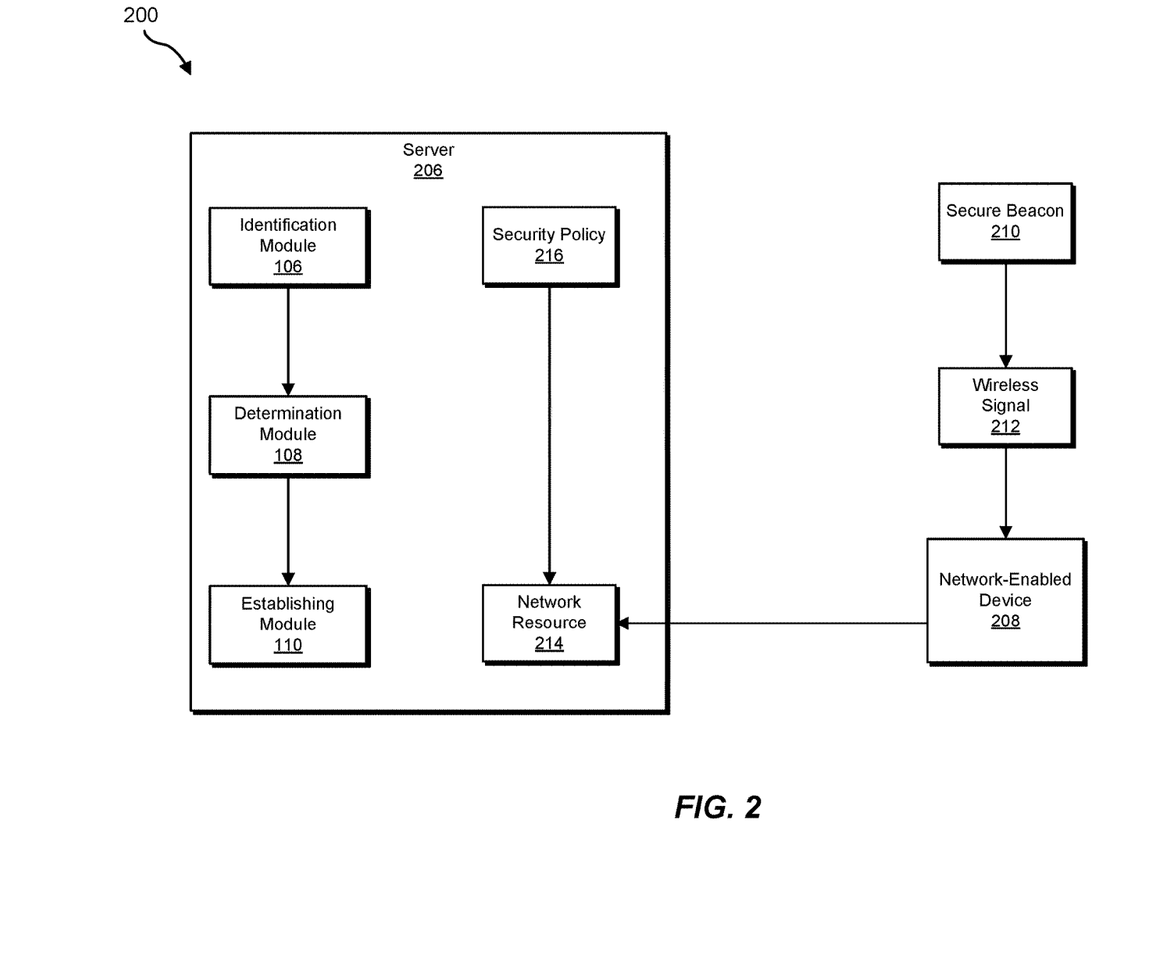
FIG. 2 is a block diagram of an additional exemplary system for automatically adjusting user access permissions based on beacon proximity.

The following will provide, with reference to FIGS. 1-2, detailed descriptions of exemplary systems for automatically adjusting user access permissions based on beacon proximity. Detailed descriptions of corresponding computer-implemented methods will also be provided in connection with FIG. 3. Further detailed descriptions of exemplary systems for automatically adjusting user access permissions based on beacon proximity will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for automatically adjusting user access permissions based on proximity to secure beacons. As illustrated in this figure, exemplary system 100 may include one or more modules 102 for performing one or more tasks. For example, and as will be explained in greater detail below, exemplary system 100 may include an identification module 106 that identifies a network-enabled device that is attempting to access a network resource. The network resource may be protected by a security policy that identifies an access level at which one or more devices may access the network resource when the one or more devices are within range of a short-range wireless signal from a secure beacon. Moreover, exemplary system 100 may include a determination module 108 that determines that the network-enabled device is within range of the short-range wireless signal from the secure beacon. Furthermore, exemplary system 100 may include an establishing module 110 that establishes, according to the security policy, the access level at which the network-enabled device is allowed to access the network resource based at least in part on the network-enabled device being within range of the short-range wireless signal from the secure beacon. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a server 206. Server 206 may be programmed with one or more of modules 102 and/or may store all or a portion of the data in a database (not illustrated). In one embodiment, one or more of modules 102 from FIG. 1 may, when executed by at least one processor of server 206, enable server 206 to adjust user access permissions based on the user's proximity to one or more secure beacons. For example, and as will be described in greater detail below, identification module 106 may identify a network-enabled device 208 that is attempting to access a network resource 214. Network resource 214 may be protected by a security policy 216, which identifies an access level at which one or more devices may access network resource 214 when the one or more devices are within range of wireless signal 212 from secure beacon 210. Determination module 108 may determine that network-enabled device 208 is within range of wireless signal 212 from secure beacon 210. Establishing module 110 may establish, according to security policy 216, the access level at which network-enabled device 208 is allowed to access network resource 214 based at least in part on network-enabled device 208 being within range of wireless signal 212 from secure beacon 210.

Server 206 generally represents any type or form of computing device that is capable of securing various network resources against unauthorized access. Examples of server 206 include, without limitation, application servers and database servers configured to provide various database services and/or run certain software applications.

The term "network resource," as used herein, generally refers to any sort of device, service, or data that is accessible over a network. Examples of network resources as devices include, without limitation, printers, fax machines, modems, routers, computing devices, servers, virtual machines, or any other digital resource that is accessible via a network. Examples of network resources as services include, without limitation, web applications, directory services, e-mail, file sharing, instant messaging, voice over Internet Protocol (VoIP), or any other suitable service that is provided via a network. Examples of network resources as data include, without limitation, files, applications, databases, or any other suitable data that may be accessed via a network. Server 206 may grant and/or restrict access to certain network resources based on a user's proximity to a secure beacon.

The term "security policy," as used herein, generally refers to one or more rules or settings that, when enforced, protect network resources on or accessible through end-user computing systems and/or any policy that may, when activated and enforced, directly and/or indirectly restrict user behavior on end-user computing systems. Examples of security policies include, without limitation, data-loss-prevention policies, access-control policies, antivirus policies, and endpoint-compliance policies.

The term "secure beacon," as used herein, generally refers to any device that transmits a short-range wireless signal that can only be detected if a network-enabled device is within a certain proximity of the secure beacon. As will be described in greater detail below, a secure beacon generally also includes at least one mechanism to prevent attackers from spoofing, mimicking, and/or duplicating the signal. The short-range wireless signal transmitted by the beacon may contain a variety of information, such as the time at which the secure beacon transmitted the short-range wireless signal, a unique identifier associated with the secure beacon, a group identifier associated with a collection of beacons that includes the secure beacon, physical location information associated with the secure beacon or any other suitable information that may be used to determine the authenticity of the short-range wireless signal and/or identify the specific beacon that transmitted the short-range wireless signal.

The term "network-enabled device," as used herein, generally refers to any computing device and/or hardware that accesses a network resource via a network. Network-enabled devices may be able to detect wireless signals from secure beacons. Examples of network-enabled devices include, without limitation, desktop computers, laptop computers, game consoles, tablet computers, e-book readers, personal digital assistants, wearable computing devices (e.g., computing devices with a head-mounted display, smartwatches, etc.), and the like.

Figure 3:
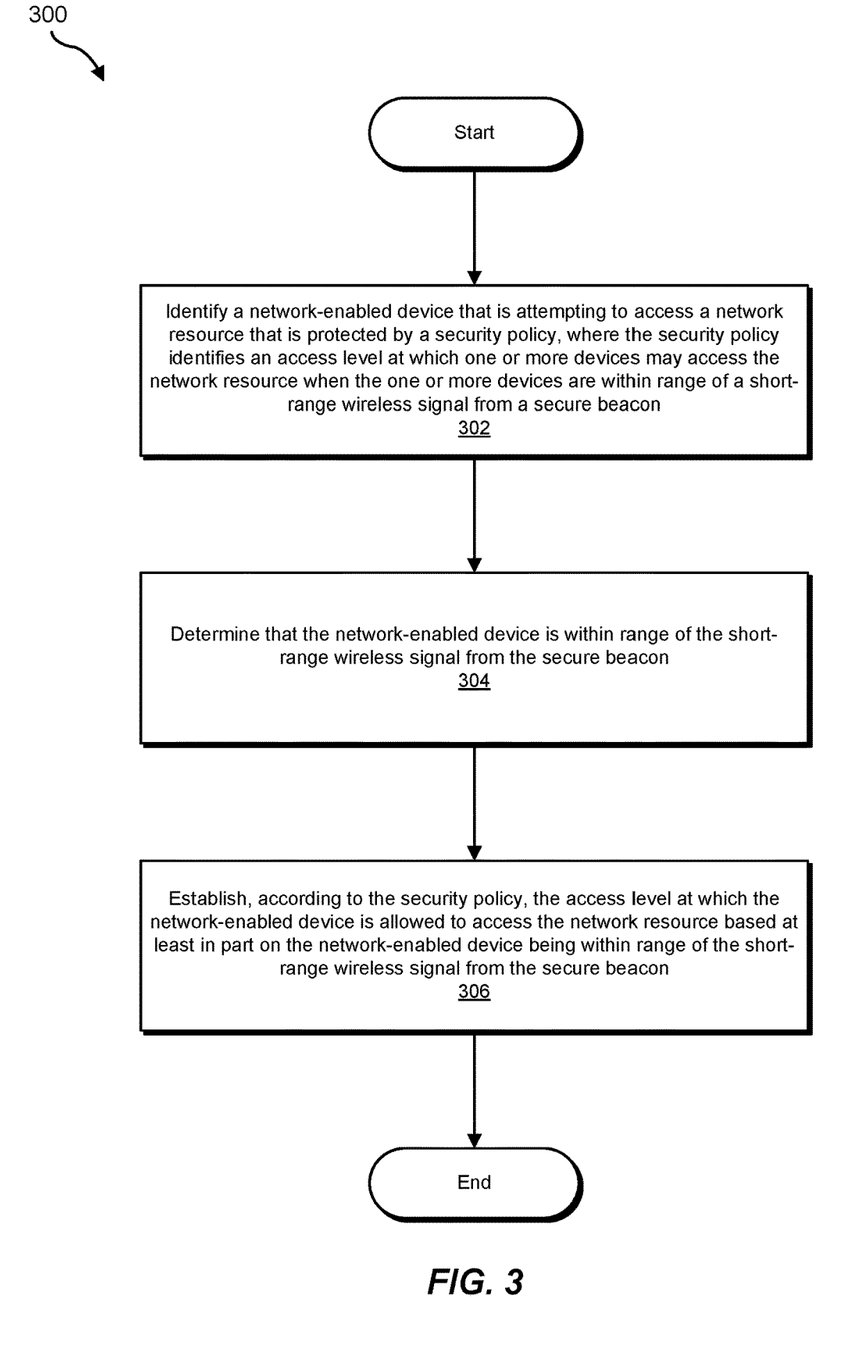
FIG. 3 is a flow diagram of an exemplary method for automatically adjusting user access permissions based on beacon proximity.

FIG. 3 is a flow diagram of an exemplary computer-implemented method 300 for automatically adjusting user access permissions based on beacon proximity. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

At step 302 in FIG. 3, one or more of the systems described herein may identify a network-enabled device that is attempting to access a network resource that is protected by a security policy, where the security policy identifies an access level at which one or more devices may access the network resource when the one or more devices are within range of the short-range wireless signal from the secure beacon. For example, identification module 106 may, as part of server 206 in FIG. 2, identify that network-enabled device 208 is attempting to access network resource 214. Network resource 214 may be protected by security policy 216, which identifies an access level at which one or more devices may access network resource 214 when the one or more devices are within range of wireless signal 212 from secure beacon 210.

Identification module 106 may identify that network-enabled device 208 is attempting to access network resource 214 in a variety of ways. For example, identification module 106 may execute as part of an authentication process that prevents unauthorized access to network resource 214, and may identify when network-enabled device 208 attempts to authenticate with the authentication process in order to gain access to network resource 214. Additionally or alternatively, all or a portion of identification module 106 may execute on network-enabled device 208 and report to server 206 that network-enabled device 208 wishes to access network resource 214.

Secure beacon 210 may include a variety of features designed to prevent network-enabled devices from fraudulently representing themselves as within range of wireless signal 212. Although described separately, secure beacon 210 may use any or all of the described security features alone or in combination. In one embodiment, the secure beacon may periodically rotate the short-range wireless signal by altering information contained within the short-range wireless signal to prevent attackers from spoofing the short-range wireless signal. In some examples, the secure beacon may rotate the signal according to a predetermined algorithm. Server 206 may use a corresponding algorithm in order to determine what information should be contained in wireless signal 212, as one or more of modules 102 may use the information contained in wireless signal 212 as part of verifying that network-enabled device 208 is within proximity to secure beacon 210. This process will be described in greater detail below. Additionally or alternatively, the secure beacon may report the rotation of the short-range wireless signal to an access-management server (e.g., server 206 in FIG. 2). This report may be used to confirm that the secure beacon rotates its signal according to a predetermined schedule and/or be used to instruct the access management server to iterate the algorithm that determines what information should be contained within wireless signal 212. Further examples of systems that utilize signal rotation will be described in greater detail below.

In some embodiments, the secure beacon may digitally sign information contained in the short-range wireless signal. Use of a digital signature may allow the network-enabled device to demonstrate the authenticity and the integrity of the short-range wireless signal to an access-management server. The access-management server may receive the signed information from the network-enabled device and verify the digital signature. If the access-management server deems that the digital signature is authentic, the access-management server may accordingly view the signed information from the short-range wireless signal as evidence that the network-enabled device is in fact within physical proximity of the secure beacon, causing one or more of modules 102 to establish an access level at which the network-enabled device may access the network resource, as will be described in greater detail below.

In addition to including a variety of security features, secure beacon 210 may take a variety of forms. For example, secure beacon 210 may include an active beacon that periodically transmits wireless signal 212. In such examples, network-enabled device 208 may merely need to receive wireless signal 212 and then provide information contained within wireless signal 212 to determination module 108. Determination module 108 may use this information to determine that network-enabled device 208 is within range of wireless signal 212.

Additionally or alternatively, secure beacon 210 may include a passive beacon that only transmits a short-range wireless signal in response to a probe signal from network-enabled device 208. In such examples, network-enabled device 208 may include software that causes network-enabled device 208 to "ping," or transmit a signal request, for nearby secure beacons. Secure beacon 210 may respond to such a ping by transmitting wireless signal 212, but otherwise refrain from transmitting signals in order to prevent unauthorized users from detecting wireless signal 212.

In some embodiments, secure beacon 210 may be embedded in a physical object that is not expected to move, such as a wall or a conference table. Secure beacons embedded in stationary objects are unlikely to move. Accordingly, individuals and organizations may reasonably believe that security policies associated with such an embedded secure beacon are likewise associated with a particular physical location. As a specific example, an organization may reasonably believe that policies associated with a secure beacon embedded in a conference table are likewise associated with the conference room that contains the conference table, thus allowing the organization to tailor security policies associated with that particular secure beacon to suit the conference room. Similarly, an organization my reasonably believe that policies associated with a secure beacon embedded in the wall of a private office are likewise associated with that office, thus allowing the organization to tailor security policies associated with the embedded beacon to suit that particular private office.

At step 304 in FIG. 3, one or more of the systems described herein may determine that the network-enabled device is within range of the short-range wireless signal from the secure beacon. For example, determination module 108 may, as part of server 206 in FIG. 2, determine that network-enabled device 208 is within range of wireless signal 212 from secure beacon 210.

Determination module 108 may determine that network-enabled device 208 is within range of wireless signal 212 in a variety of ways. For example, network-enabled device 208 may provide information contained within wireless signal 212 to determination module 108, thus giving determination module 108 reason to acknowledge that network-enabled device 208 is within range of wireless signal 212.

Figure 4:
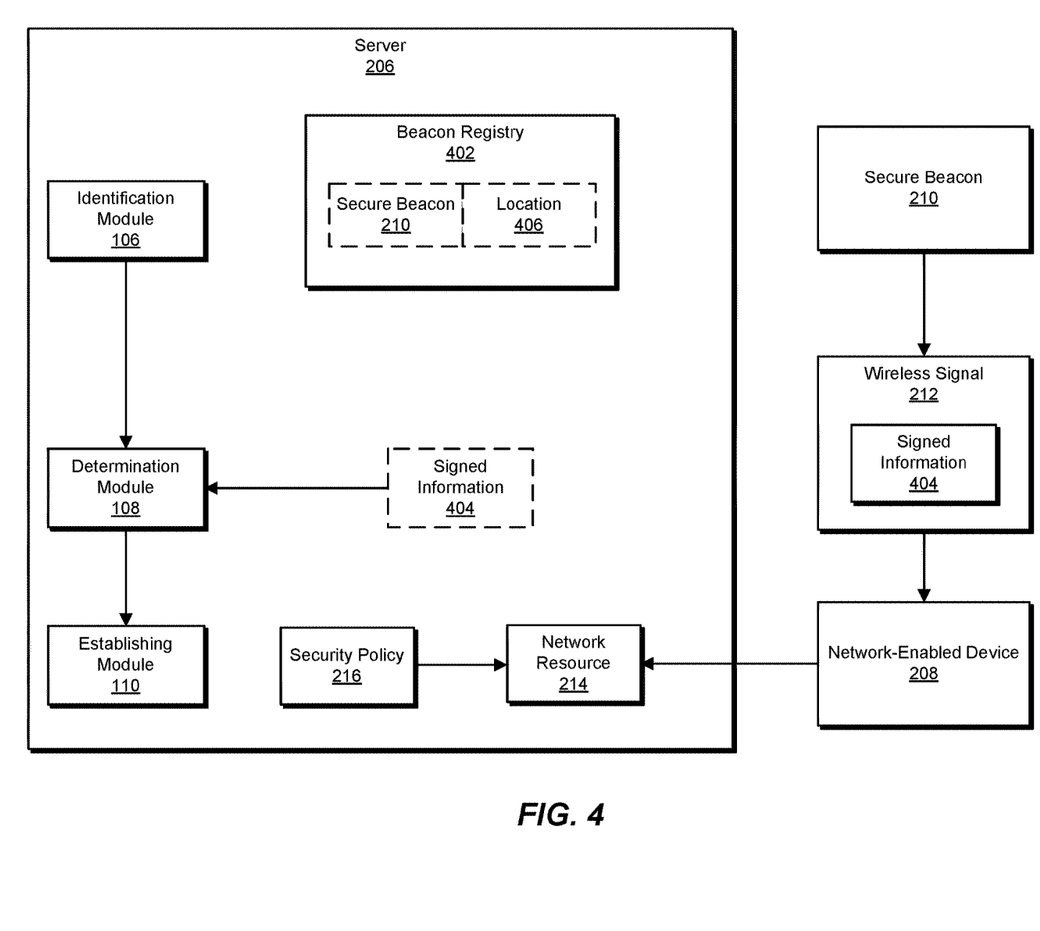
FIG. 4 is a block diagram of an exemplary computing system for automatically adjusting user access permissions based on beacon proximity.

An illustrated example of this interaction between secure beacon 210, network-enabled device 208, and server 206 are shown in FIG. 4. As illustrated in FIG. 4, server 206 may control access to network resource 214 in accordance with security policy 216. Additionally, server 206 may maintain a beacon registry 402 that contains an entry for secure beacon 210 in association with a location 406 that corresponds to the physical location of secure beacon 210. Network-enabled device 208 may, as described in greater detail above, receive wireless signal 212 from secure beacon 210. Wireless signal 212 may contain signed information 404 that identifies secure beacon 210 and has been digitally signed by secure beacon 210. Various devices, such as network-enabled device 208, may present signed information 404 to server 206 as proof that they are within proximity to secure beacon 210. Determination module 108 may receive and verify the authenticity of signed information 404 from network-enabled device 208, such as by comparing signed information 404 received from network-enabled device 208 with a set of expected signed information derived from beacon registry 402. Establishing module 110 may then establish an access level at which network-enabled device 208 may access network resource 214 in accordance with security policy 216.

Figure 5:
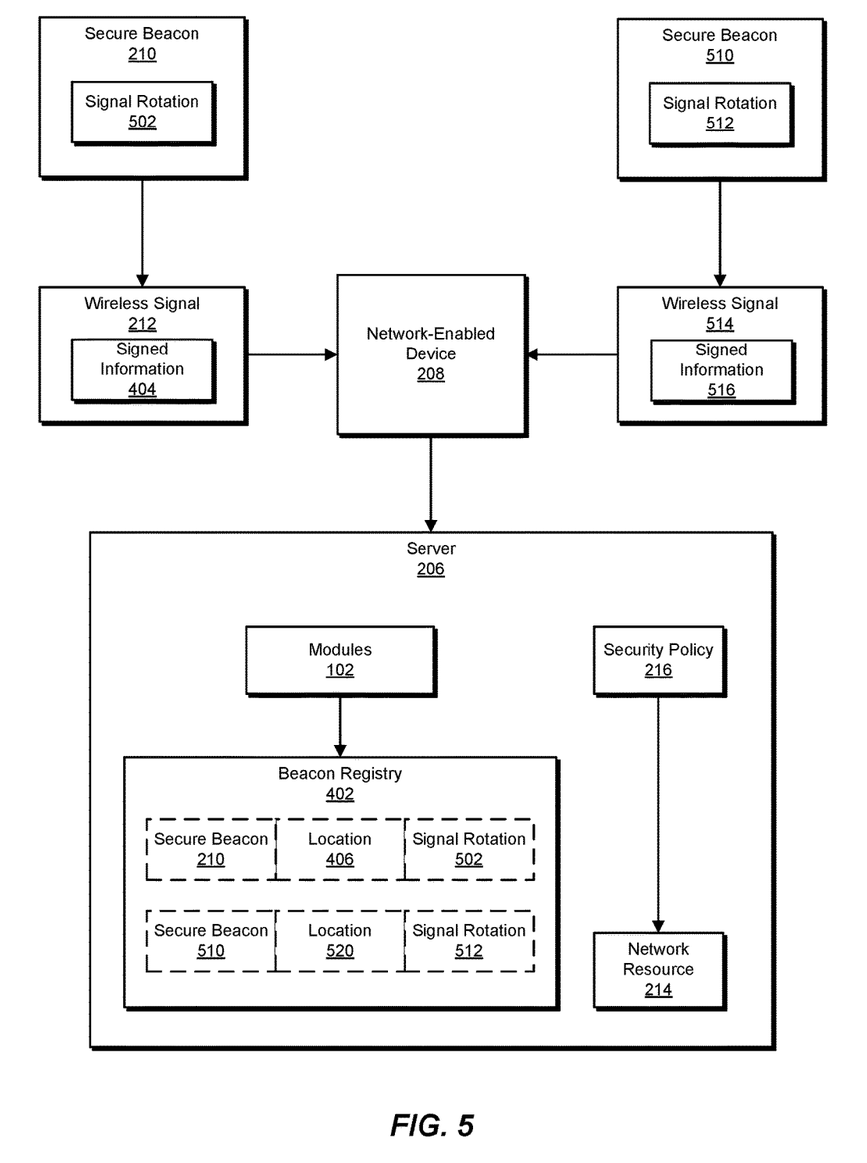
FIG. 5 is a block diagram of an exemplary computing system for automatically adjusting user access permissions based on beacon proximity.

In some examples, systems described herein may track policies associated with various beacons by maintaining a registry of multiple secure beacons (e.g., beacon registry 402 as illustrated in FIGS. 4 and 5) in association with a security policy for each secure beacon in the registry. Such a registry may contain an entry for secure beacon 210, along with entries for any other beacons in use by the system that maintains the registry. Each beacon may be located in a different physical location, and each security policy in the registry may establish a policy that is appropriate to the physical location of the secure beacon that is associated with the security policy. With reference to FIG. 5, one or more modules may track beacons and their associated physical locations in beacon registry 402. Although security policy 216 is illustrated as separate from beacon registry in FIG. 5, in some embodiments, each secure beacon in beacon registry 402 may be associated with a different security policy. Alternatively and as illustrated in FIG. 5, security policy 216 may encompass the entirety of the beacon network represented by beacon registry 402 (e.g., if a network-enabled device reports proximity to this beacon, it has this particular level of access to network resource 214). In such embodiments, security policy 216 may include a variety of conditional statements such as "if a device reports that it is near this beacon, it has this level of access to this network resource."

As described in greater detail above, secure beacons may rotate the information contained in their transmitted wireless signals in order to prevent attackers from spoofing the signal or otherwise falsely representing that they have received the wireless signal from the secure beacon. Beacon registry 402 may track these signal rotations so that one or more of modules 102 may confirm that the information presented by a network-enabled device (e.g., network-enabled device 208) correctly represents that device being within physical proximity of the secure beacon. As shown in FIG. 5, secure beacon 210 may use a signal rotation 502 to determine some or all of the information contained in wireless signal 212. Beacon registry 402 may track signal rotation 502 in association with a registry entry for secure beacon 210. Similarly, beacon registry 102 may track signal rotation information for other secure beacons (e.g., secure beacon 510 in association with signal rotation 512).

Furthermore, in some examples, systems described herein may determine that the network-enabled device is within range of an additional short-range wireless signal from an additional secure beacon. For example and as illustrated in FIG. 5, network-enabled device 208 may be near secure beacon 210 as well as an additional beacon, secure beacon 510. Some embodiments may utilize proximity to multiple beacons for a variety of reasons, including but not limited to acting as an additional layer of security and/or more providing finer granularity of control over location-based access-control policies. Secure beacon may use a separate signal rotation and digital signature from secure beacon 210, illustrated as signal rotation 512 and signed information 516, respectively. Beacon registry 402 may contain an entry for each secure beacon, including secure beacon 510. In the example of FIG. 5, the registry entry for secure beacon 510 is associated with location 520 which is physically close to location 406, as evidenced by the fact that network-enabled device 208 can detect both wireless signal 212 and wireless signal 514 from secure beacons 210 and 510 respectively. The registry entry for secure beacon 510 may also be associated with a signal rotation 512, representing the algorithm or schedule used by secure beacon 510 to modify information contained in wireless signal 514.

In some embodiments, one or more of modules 102 may determine which beacon is closer to network-enabled device 208 and select that particular beacon in order to establish the access level at which network-enabled device 208 may access network resource 214. In further embodiments, one or more of modules 102 may indicate that certain beacons have a higher "priority" than other beacons. If a network-enabled device is within proximity to multiple secure beacons, the beacon with the highest priority may be selected as the beacon by which to judge which access level the network-enabled device may access network resource 214. Additionally or alternatively, security policy 216 may include conditional statements for when a network-enabled device reports that it is within proximity to more than one secure beacon. For example, security policy 216 may include such conditions as "if a device can see these two beacons, then it has this level of access to this network resource." Naturally, these conditions may be written in combination with beacon priorities or any other suitable conditions by which to judge the physical location of a network-enabled device.

At step 306, one or more of the systems described herein may establish, according to the security policy, the access level at which the network-enabled device is allowed to access the network resource based at least in part on the network-enabled device being within range of the short-range wireless signal from the secure beacon. For example, establishing module 110 may, as part of server 206 in FIG. 2, establish, according to security policy 216, the access level at which network-enabled device 208 is allowed to access network resource 214 based at least in part on network-enabled device 208 being within range of wireless signal 212.

Establishing module 110 may maintain a registry (e.g., beacon registry 402 in FIGS. 4 and 5) of multiple secure beacons in association with a specific security policy for each secure beacon in the registry. This registry may contain an entry for secure beacon 210 in addition to entries for other beacons that modules 102 may use to establish access permissions for network-enabled device 208. Each additional secure beacon in the registry may be located in a different physical location from other secure beacons in the registry. For example, each secure beacon may be located in different rooms throughout an office building. Each specific security policy in the registry may establish a policy that is appropriate to the physical location of the additional secure beacon that is associated with the specific security policy, as will be described in greater detail below.

In some examples, establishing module 110 may prevent network-enabled device 208 from accessing at least one network resource. For example, establishing module 110 may prevent network-enabled device 208 from accessing sensitive data while near a secure beacon that is associated with a security policy that represents a less-secure location. As a specific example, the secure beacon may be embedded in the wall of an unsecured peripheral conference room. The secure beacon may be associated with a security policy that causes establishing module 110 to prevent network-enabled device 208 from accessing financial records so long as determination module 108 determines that network-enabled device 208 is within proximity to that particular secure beacon.

Additionally or alternatively, establishing module 110 may grant network-enabled device 208 access to at least one secure network resource. For example, establishing module 110 may permit network-enabled device 208 to access sensitive or secure data while near a secure beacon that is associated with a security policy that represents a safe or secure location. As a specific example, establishing module 110 may allow network-enabled device 208 to access financial records so long as determination module 108 determines that network-enabled device 208 is within proximity to a secure beacon that represents an internal office room.

Furthermore, establishing module 110 may grant the network-enabled device access to some network resources while restricting access to others. For example, establishing module 110 may permit network-enabled device 208 to access sensitive or secure data while simultaneously restricting network-enabled device 208 from communicating with external networks. As a specific example, establishing module 110 may allow network-enabled device 208 to access financial records while simultaneously blocking network-enabled device 208 from accessing a router that connects to the Internet. Conversely, establishing module 110 may allow network-enabled device 208 to access the router that connects to the Internet but block network-enabled device 208 from accessing sensitive material.

In some cases, establishing module 110 may grant partial access to network-enabled device 208, enabling network-enabled device 208 to access some features of network resource 214 but not others. For example, network resource 214 may be a collection of applications hosted by server 206. Establishing module 110 may determine that network-enabled device 208 may only access these applications at a particular access level, e.g., a guest access level, based on network-enabled device 208 being in proximity to secure beacon 210. As an additional example, network resource 214 may be a file storage server. Establishing module 110 may determine, according to security policy 216 and based on the device's proximity to secure beacon 210, that network-enabled device 208 may read and/or download files from the file storage server, but not upload or modify files.

As described in greater detail above, systems and methods described herein may allow access-management servers to automatically grant and/or deny various network-enabled devices access to various network resources based on the network-enabled devices' proximity to one or more secure beacons. These secure beacons may transmit a short-range wireless signal and incorporate a variety of measures, such as signal rotation and/or signing information contained in the wireless signal, to prevent attackers from recording, duplication, or otherwise spoofing the signal.

Figure 6:
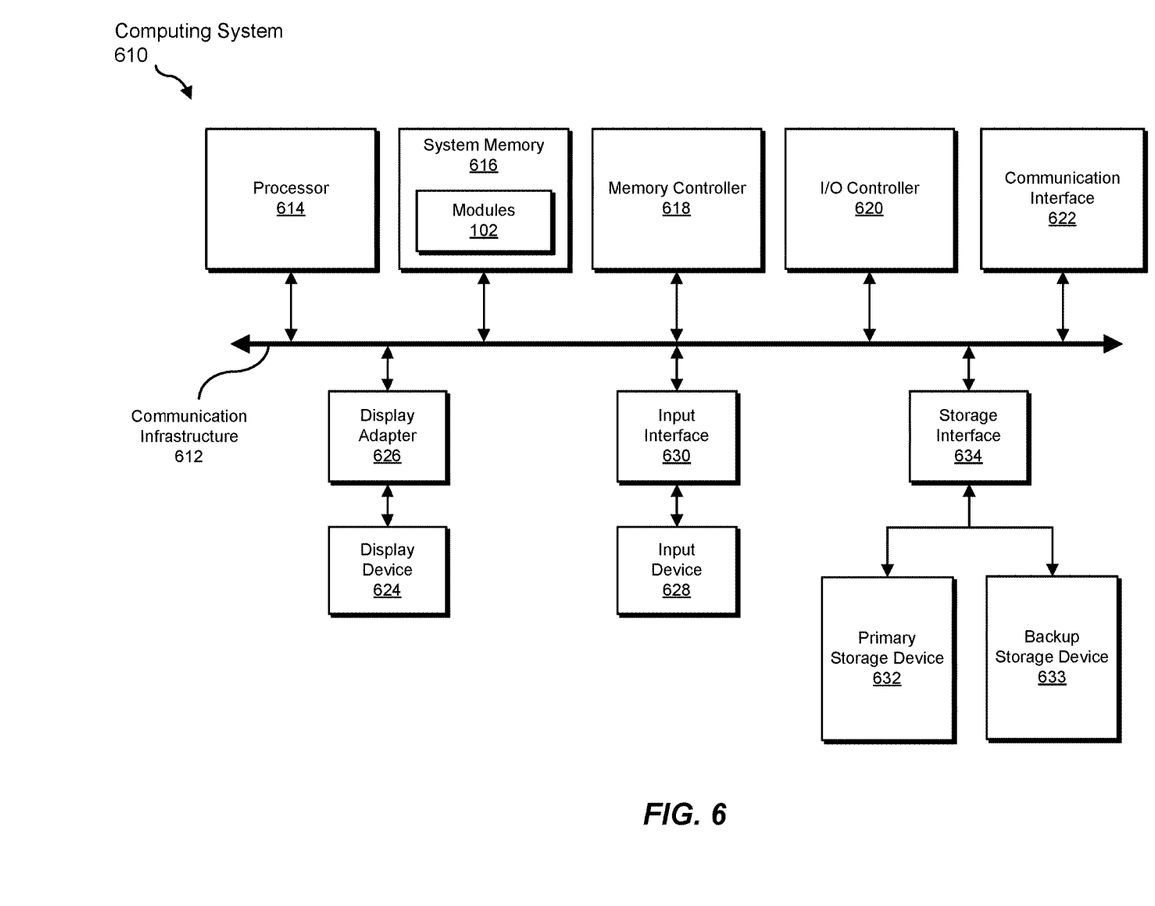
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
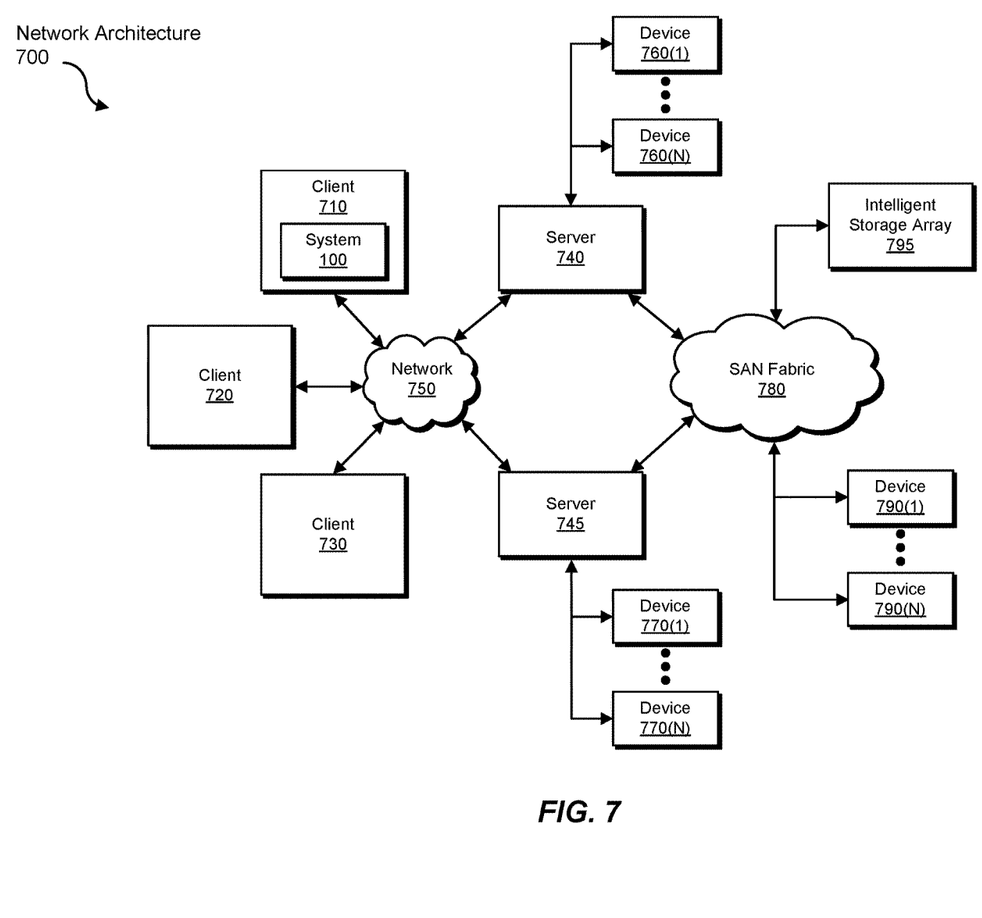
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for automatically adjusting user access permissions based on beacon proximity.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information from a secure beacon, use the information to verify that a network-enabled device is in proximity to the secure beacon, use a result of the verification to determine a security policy associated with the secure beacon, use a result of the determination to grant and/or deny the network-enabled device access to a network resource, and/or output a result of the analysis and/or determination to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automatically adjusting user access permissions based on beacon proximity, at least a portion of the method being performed by a computing device comprising at least one processor, the method comprising:
    configuring, at an access-management server that controls access to a network resource, a security policy that specifies an access level at which devices may access the network resource when the devices are within range of a short-range wireless signal from a secure beacon that is associated with a specific physical location and incorporates at least one anti-spoofing mechanism;
    creating a registry of multiple secure beacons in association with a specific security policy for each secure beacon in the registry, wherein:
        the registry contains an entry for the secure beacon;
        each additional secure beacon in the registry is located in a different physical location from other secure beacons in the registry; and
        each specific security policy in the registry establishes a policy that is appropriate to the physical location of the additional secure beacon that is associated with the specific security policy;
    identifying a network-enabled device that is attempting to access the network resource that is controlled by the access-management server and protected by the security policy;
    determining, at the access-management server, that the network-enabled device is located at the specific physical location based at least in part on receiving, from the network-enabled device, information demonstrating that the network-enabled device is within range of the short-range wireless signal from the secure beacon; and
    establishing, at the access-management server and according to the security policy, the access level at which the network-enabled device is allowed to access the network resource based at least in part on determining that the network-enabled device is located at the specific physical location.

2. The method of claim 1, wherein the secure beacon periodically rotates the shortrange wireless signal by altering information contained within the short-range wireless signal to prevent attackers from spoofing the short-range wireless signal.

3. The method of claim 2, wherein the secure beacon reports the rotation of the short-range wireless signal to the access-management server.

4. The method of claim 1, wherein:
    the secure beacon signs the information contained in the short-range wireless signal with a digital signature;
    the digital signature enables the network-enabled device to demonstrate the authenticity and the integrity of the short-range wireless signal to the access-management server; and
    determining that the network-enabled device is within range of the short-range wireless signal from the secure beacon comprises:
        receiving, at the access-management server, the signed information contained in the short-range wireless signal from the network-enabled device; and verifying the digital signature attached to the signed information.

5. The method of claim 1, wherein the secure beacon comprises an active beacon that periodically transmits the short-range wireless signal.

6. The method of claim 1, wherein the secure beacon comprises a passive beacon that only transmits the short-range wireless signal in response to a probe signal from the network-enabled device.

7. The method of claim 1, wherein the secure beacon is embedded within a physical object that is expected to remain stationary.

8. The method of claim 1, wherein establishing the access level at which the network-enabled device may access the network resource comprises one or more of:
preventing the network-enabled device from accessing at least one network resource; and
granting the network-enabled device access to at least one secure network resource.

9. The method of claim 1, further comprising determining that the network-enabled device is within range of an additional short-range wireless signal from an additional secure beacon.

10. The method of claim 1, wherein the secure beacon comprises at least one mechanism that prevents attackers from spoofing the short-range wireless signal.

11. The method of claim 1, wherein the short-range wireless signal contains information describing one or more of:
the time at which the secure beacon transmitted the short-range wireless signal;
a unique identifier associated with the secure beacon;
a group identifier associated with a collection of beacons that includes the secure beacon; and
physical location information associated with the secure beacon.

12. A system for automatically adjusting user access permissions based on beacon proximity, the system comprising:
a configuration module, stored in a memory of the system, that:
configures, at an access-management server that controls access to a network resource, a security policy that specifies an access level at which devices may access the network resource when the devices are within range of a short-range wireless signal from a secure beacon that is associated with a specific physical location and incorporates at least one anti-spoofing mechanism; and
creates a registry of multiple secure beacons in association with a specific security policy for each secure beacon in the registry, wherein:
the registry contains an entry for the secure beacon;
each additional secure beacon in the registry is located in a different physical location from other secure beacons in the registry; and
each specific security policy in the registry establishes a policy that is appropriate to the physical location of the additional secure beacon that is associated with the specific security policy;
an identification module, stored in the memory, that identifies a network-enabled device that is attempting to access the network resource that is protected by a security policy;
a determination module, stored in the memory, that determines, at the access-management server, that the network-enabled device is located at the specific physical location based at least in part on receiving, from the network-enabled device, information demonstrating that the network-enabled device is within range of the short-range wireless signal from the secure beacon;
an establishing module, stored in the memory, that establishes, at the access-management server and according to the security policy, the access level at which the network-enabled device is allowed to access the network resource based at least in part on determining that the network-enabled device is located at the specific physical location; and
at least one physical processor configured to execute the configuration module, the identification module, the determination module, and the establishing module.

13. The system of claim 12, wherein the secure beacon periodically rotates the shortrange wireless signal by altering information contained within the short-range wireless signal to prevent attackers from spoofing the short-range wireless signal.

14. The system of claim 13, wherein the secure beacon reports the rotation of the short-range wireless signal to the access-management server.

15. The system of claim 12, wherein:
the secure beacon signs the information contained in the short-range wireless signal with a digital signature;
the digital signature enables the network-enabled device to demonstrate the authenticity and the integrity of the short-range wireless signal to the access-management server; and
the determination module determines that the network-enabled device is within range of the short-range wireless signal from the secure beacon by:
receiving, at the access-management server, the signed information contained in the short-range wireless signal from the network-enabled device; and
verifying the digital signature attached to the signed information.

16. The system of claim 12, wherein the secure beacon comprises an active beacon that periodically transmits the short-range wireless signal.

17. The system of claim 12, wherein the secure beacon comprises a passive beacon that only transmits the short-range wireless signal in response to a probe signal from the network-enabled device.

18. A non-transitory computer-readable medium comprising one or more computer-readable instructions that, when executed by at least one processor of a computing device, cause the computing device to:
configure, at an access-management server that controls access to a network resource, a security policy that specifies an access level at which devices may access the network resource when the devices are within range of a short-range wireless signal from a secure beacon that is associated with a specific physical location and incorporates at least one anti-spoofing mechanism;
create a registry of multiple secure beacons in association with a specific security policy for each secure beacon in the registry, wherein:
the registry contains an entry for the secure beacon;
each additional secure beacon in the registry is located in a different physical location from other secure beacons in the registry; and
each specific security policy in the registry establishes a policy that is appropriate to the physical location of the additional secure beacon that is associated with the specific security policy;

identify a network-enabled device that is attempting to access the network resource that is controlled by the access-management server and protected by the security policy;

determine, at the access-management server, that the network-enabled device is located at the specific physical location based at least in part on receiving, from the network-enabled device, information demonstrating that the network-enabled device is within range of the short-range wireless signal from the secure beacon; and establish, at the access-management server and according to the security policy, the access level at which the network-enabled device is allowed to access the network resource based at least in part on determining that the network-enabled device is located at the specific physical location.

\* \* \* \* \*